March 18, 1941.    L. N. MESTRE    2,235,460
APPARATUS FOR MICROSCOPIC PROJECTION
Filed Aug. 10, 1937
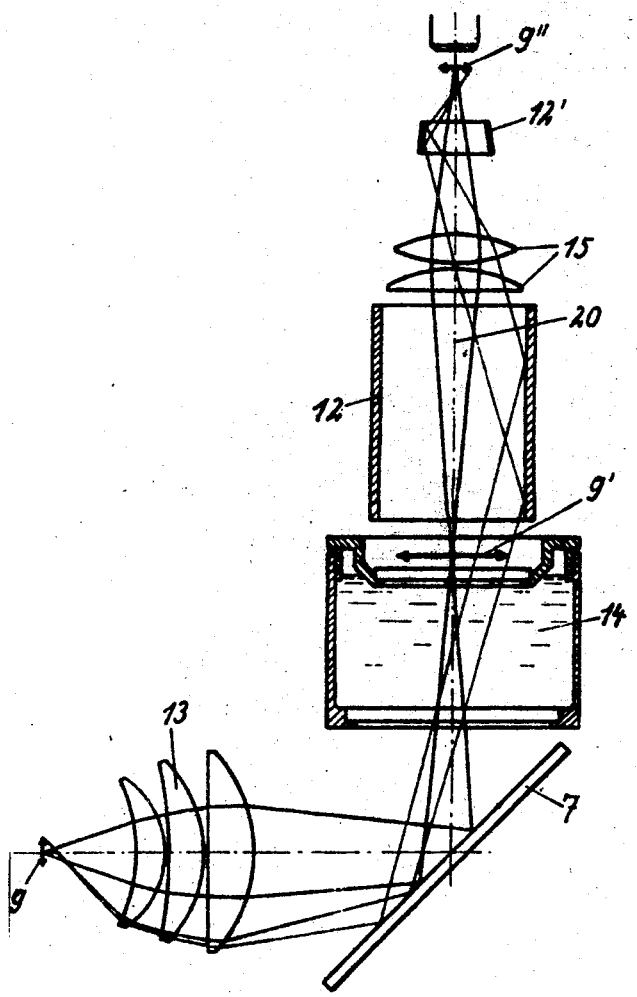
L. N. Mestre
Inventor
By: Glascock Downing &...

Patented Mar. 18, 1941

2,235,460

UNITED STATES PATENT OFFICE 2,235,460

APPARATUS FOR MICROSCOPIC PROJECTION

Louis Nicolas Mestre, Paris, France, assignor to Anciens Etablissements Barbier, Benard & Turenne, Paris, France, a French company Application August 10, 1937, Serial No. 158,417
In France November 30, 1936

1 Claim. (Cl. 240—2)

The projection of microscopic preparations or the like at a great distance on a screen of considerable area forms a powerful method of research and of teaching, the generalization of which has hitherto been prevented by the complication and the difficulties of use of the apparatus which were available.

Such difficulties were inherent in particular in the illuminating device comprising a flickering and rather unstable arc lamp, the wearing away of the carbons of which necessitates frequent stoppage and wherein furthermore, the use of one condenser per objective and the placing in position of the preparation render the projection difficult.

My invention has for its object an illuminating system, more particularly for microscopic projection, which comprises a high pressure mercury vapour lamp forming an absolutely stable linear source of light of great brilliancy, cooperating with an optical system producing from said source an image of very small size.

According to an embodiment, said optical system includes in front of a condenser of the usual type, a reflecting surface, of revolution about the optical axis and of relatively great length, called recuperator and arranged so as to bring the marginal rays back towards the optical axis, the said rays which are thus reflected being sent back towards the image by a second reflecting surface or recuperator, which is likewise a surface of revolution about the optical axis and arranged between said condenser and said image.

Other characteristics and advantages of my invention will moreover become apparent from the ensuing description taken with reference to the accompanying drawing which is given solely by way of example and which shows diagrammatically an embodiment of my invention.

According to the embodiment shown, the linear luminous source 9 formed by a high pressure gas lamp is placed at the focus of a convergent optical system 13 forming a condenser and which is arranged laterally relatively to the optical axis 20 of the projection apparatus. The luminous beam emerging from the system 13 is reflected by a mirror 7 inclined at 45° in the direction of said axis 20 and supplies at the outlet of the water tank 14 a real image 9' from which a further convergent system 15 supplies the final image 9" on the plane of the object to be projected.

Two reflecting surfaces 12 and 12' of revolution about the axis 20, and made of silvered metal or of polished glass and called "recuperators," are arranged one on either side of the system 15. The recuperator 12 which is shown as of cylindrical shape brings the marginal luminous beams due to the great length of the source 9, back towards the optical axis 20 and renders them useful, and the recuperator 12' shown as of conical shape has a shape such that it reflects, towards the image 9", the rays reflected by the recuperator 12 which have passed through the condenser 15.

An intense luminous image which is almost a point is thus obtained on the preparation or the like to be projected.

While I have described what I at present consider a preferred embodiment of my invention, it will be obvious to those skilled in the art that various changes and modifications may be made without departing from my invention and I therefore aim in the appended claim to cover all such changes and modifications as fall within the true spirit and scope of my invention.

What I claim is:

An illuminating system more particularly designed for an apparatus for microscopic projection and including a high pressure gas lamp forming a linear source of light and an optical device the optical axis of which is substantially perpendicular to said source of light, said optical device including a convergent optical system arranged to form a real image of said linear source of light, a further convergent system placed between said image and the object plane and arranged to form on said plane and from said image a further real image of great brilliancy of said source and of very small size, a tubular body provided between said first named real image and said further convergent system, the internal surface of said body being a surface of revolution about said axis of said optical device and of sufficient diameter not to be impinged on by the rays emanating from said first named image and arriving without deviation on said further convergent system, said surface being thus arranged to reflect the marginal rays emanating from said first named image back towards said further convergent system, a further tubular body disposed between said further convergent system and said further real image, the internal surface of said further body being a surface of revolution about said axis of said optical device and of sufficient diameter to surround the central convergent pencil of light emerging from said further convergent system, said internal surface of said further body being a reflecting surface and arranged to direct towards said further image the marginal rays which have been reflected by said first named tubular body.

LOUIS NICOLAS MESTRE.